ns

PATENTED APR 18 1972

INVENTOR.
Robert C. Anthony
BY K. H. MacLean, Jr.
ATTORNEY

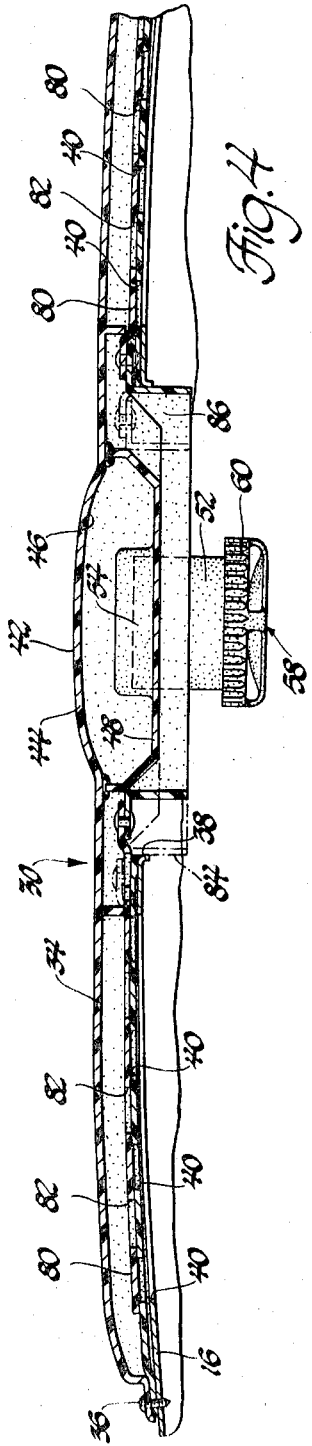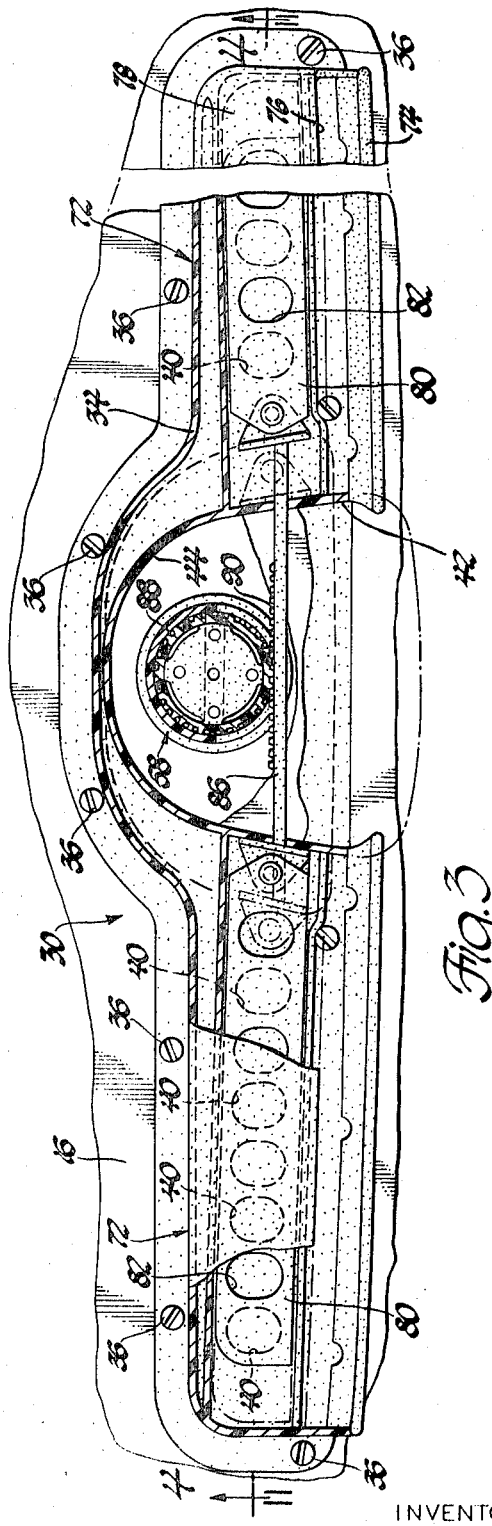

TRUCK CAB ROOF VENTILATOR

This invention relates to a ventilator system for the passenger compartment of vehicles.

A ventilating system for vehicles which circulates fresh air in the upper portion of a passenger compartment is desirable. Most ventilating systems introduce air into the passenger compartment at a relatively low level beneath the vehicle dashboard. Subsequently, the air is exhausted through outlets positioned at a low level. The air in the upper portion of the passenger compartment is insufficiently circulated to maintain the passenger's comfort.

The subject invention includes a vehicle passenger compartment ventilator with inlet and outlet openings through the exterior roof of the vehicle immediately to the rear of the windshield. A rotatable inlet valve in the inlet controls air flow into the passenger compartment to selectively provide desirable air flow. An inner roof panel spaced from the outer roof panel forms an exhaust air flow path therebetween which extends from a low level exhaust opening adjacent the seat back to the outlet openings in the outer roof panel. A slide valve opens and closes the outlet in the exhaust outer roof panel. Gear means operably connected to the slide valve and to the rotatable inlet valve operate the inlet and the outlet simultaneously.

Therefore, an object of the invention is to provide a vehicle ventilator for a passenger compartment which introduces air into the upper portion of the passenger compartment and withdraws the air at a lower level near the rear of the passenger compartment to provide desirable circulation.

A further object of the invention is to provide a vehicle ventilator for a passenger compartment having an air discharge passage formed between inner and outer roof panels and a low level exhaust opening in the rear of the passenger compartment which decreases the transmission undesirable noise into the passenger compartment at a level adjacent the operator's ears.

A still further object of the invention is to provide a vehicle ventilator for a passenger compartment having inlet and outlet openings in the vehicle roof which are selectively opened and closed simultaneously by the manipulation of a single member.

Further objects and advantages of the present invention will be apparent from the following detailed description, reference being had to the accompanying drawings in which a preferred embodiment is clearly shown. IN THE DRAWINGS:

FIG. 3 is a horizontal sectioned view of the ventilator taken along section line 3—3 of FIG. 2 and looking in the direction of the arrows; and FIG. 4 is a vertical sectioned view of the ventilator taken along section line 4—4 of FIG. 3 and looking in the direction of the arrows.

Figure 1:
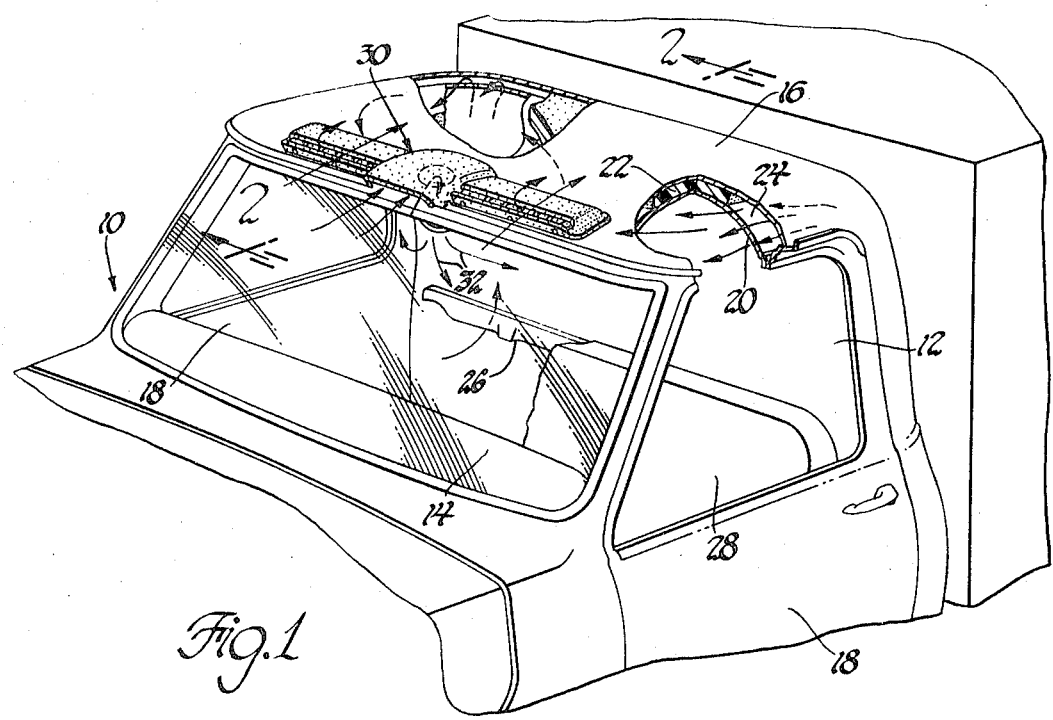
FIG. 1 is a perspective view of a truck-type vehicle partially broken away to reveal the subject ventilator system.

A truck-type vehicle 10 is shown in FIG. 1 which includes a passenger compartment 12 formed by a windshield 14, an outer roof panel 16 and side doors 18. Passenger compartment 12 is further defined by an inner roof panel 20 spaced from the outer roof panel 16 by insulation material 22. The space between the panels defines an air flow passage 24 which extends from an opening 26 adjacent the rear of the seatback 28 to a ventilator on the roof top generally shown by the numeral 30. Air entering a central inlet portion of ventilator 30 passes downward into the passenger compartment 12 as shown by the air flow arrows 32. The air then passes downward through passenger compartment 12, into the opening 26 and through the passage 24 to the ventilator 30.

Figure 2:
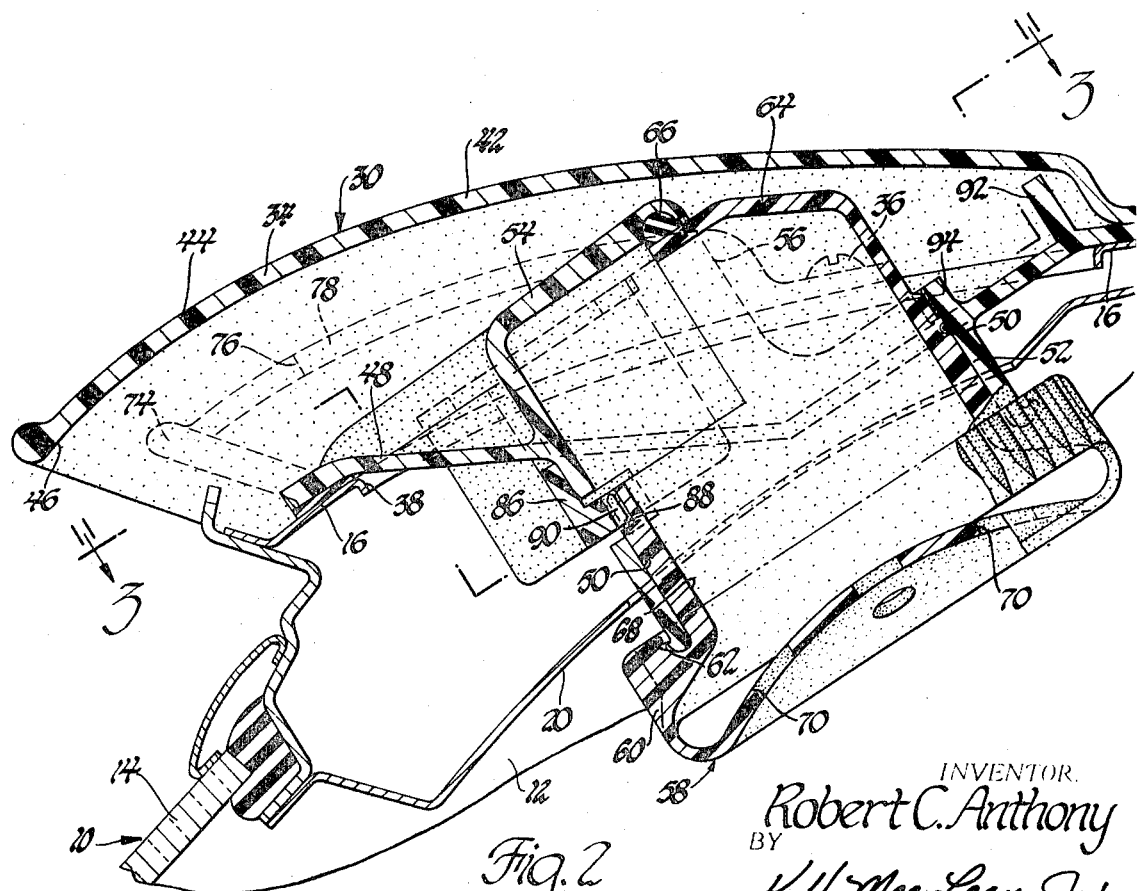
FIG. 2 is a vertical sectioned view of the ventilator taken along section line 2—2 of FIG. 1 and looking in the direction of the arrows.

Details of the ventilator 30 are shown in FIGS. 2–4 in which a housing 34 is fastened to the outer roof panel 16 by a number of screws 36. The housing 34 overlies a central inlet opening 38 and outlet openings 40 in the panel 16. In a midportion 42 of housing 34, a forwardly directed inlet air scoop 44 is formed as shown in FIG. 2. The air scoop 44 includes an opening 46 through which air is directed to opening 38 and into the passenger compartment 12. A member 48 forms the floor of air scoop 44. Member 48 has an inlet bore 50 therein supporting a rotatable inlet valve 52 for controlling the flow of air into the passenger compartment 12.

More particularly, member 48 includes a cylindrical portion 52 which extends through the inlet opening 38. The upper end of the cylindrical portion 52 is partially closed by a semi-circular end portion 54 which leaves a cutout 56 forming an inlet through which air may pass into the passenger compartment 12. A cylindrical valve member 58 is rotatable within bore 50. The valve 58 includes an enlarged head portion 60 which engages an annular shoulder 62 on the portion 52 of member 48 to connect the valve 58 and member 48. The upper end of cylindrical valve 58 is covered by a semi-circular end portion 64 which coacts with end portion 54 of member 48 to close the inlet cutout 56 when the valve 58 is in a first operative position in which air is prevented from flowing into passenger compartment 12. An elongated elastic sealing member 66 between the end portions 54 and 64 prevents leakage of air therebetween.

The valve 58 includes an axial air passage 68 from end 64 to the portion 60. A number of openings 70 through the portion 60 permit air to flow into said passenger compartment 12 when the valve 58 is pivoted to open the cutout 56.

Air entering the passenger compartment 12 flows generally downward and rearward toward opening 26 adjacent the seatback 28. The air then flows through the passage 24 between the roof panels 16 and 20 before it is discharged through the outlet openings 40 to atmosphere. The outlet openings 40 are covered by side portions 72 of the housing 34. The portions 72 include front members 74 which prevents air flow over the exterior of the vehicle from passing directly into openings 40 and which produces a suction or low pressure to draw air through elongated openings 76 in the top 78 of portions 72. The outlet openings 40 are opened and closed by interconnected slide valves 80 which overlay the openings 40. Port 82 through the slide valves 80 are aligned with the openings 40 when the valves are moved into a second operative position 84 shown in FIG. 4. The slide valves 80 are moved simultaneously by an interconnecting arm 86 which moves in a direction tangent to the cylindrical valve 58. In this operative position, air flows from the passage 24 through the openings 40, ports 82 and to the atmosphere.

The cylindrical valve 58 and slide valves 80 are interconnected by arm 86 so that rotation of the inlet valve 58 into an open position also opens the outlet valves. In FIG. 3, gear teeth 88 are formed on the exterior surface of the valve 58. The gear teeth 88 coact with gear teeth 90 on the arm 86. As the inlet valve 58 is rotated from a first operative closed position to a second operative open position, the slide valves 80 are moved from a first operative closed position to a second operative open position. Thus, air is introduced into the upper forward portion of passenger compartment 12 and air is removed from the lower rear portion to ventilate the vehicle.

The cutout 56 in the semi-circular portion 54 of member 48 is faced to the rear of the vehicle away from opening 46 which effectively prevents rain water from passing into the interior of the vehicle through the valve 58. Water that does enter opening 46 strikes a member 92 and is thus prevented from entering inlet cutout 56 by a raised edge 94 of member 48. The collected water is drained through opening 46.

While the embodiment as herein described and illustrated constitutes a preferred form, other forms may be adapted.

What is claimed is as follows:

1. A ventilation system for a vehicle of the type having a passenger compartment partially defined by a windshield and a roof comprising: an outer roof panel with inlet and outlet openings therethrough located rearwardly of said windshield; an inner roof panel spaced from said outer roof panel to form an air passage therebetween; a housing member supported on said outer roof panel in overlying relation to said inlet and outlet openings; said housing member including a forwardly extending air scoop to direct air into said inlet opening; inlet valve means extending through said inlet opening and said inner roof panel for controlling air flowing into said passenger compartment; said valve means including a rotatable tubular member having an axial passage therethrough and a semi-circular end portion coactive with said housing to block air flow through said axial passage when pivoted into a first operative position and opening said axial passage for air flow into said passenger compartment when pivoted into a second operative position; an outlet valve means closing said outlet openings when in said first operative position and opening said outlet openings when in a second operative position for discharging air from said passenger compartment to atmosphere through said air passage; an arm connected to said outlet valve means and contacting said tubular member; gear means on said rotatable member and said arm coactive together to move said outlet valve means between its first and second operative positions when said tubular member is rotated between its first and second operative positions; said inner roof panel to said passenger compartment opening at a low level with respect to said inlet opening and in the rear of said passenger compartment to define an exhaust flow path therefrom and between said roof panels to said outlet openings.

2. A ventilation system for a vehicle body of the type having a passenger compartment partially defined by a windshield and a roof comprising: an outer roof panel with inlet and outlet openings therethrough located rearwardly of said windshield; an inner roof panel spaced from said outer roof panel to form an air passage therebetween; a housing member supported on said outer roof panel in overlying relation to said inlet and outlet openings; said housing member including a forwardly extending air scoop to direct air into said inlet opening; inlet valve means extending through said inlet opening and said inner roof panel for controlling air flowing into said passenger compartment; said valve means including a rotatable tubular member having an axial passage therethrough and a semi-circular end portion coactive with said housing to block air flow through said axial passage when pivoted into a first operative position and opening said axial passage for air flow into said passenger compartment when pivoted into a second operative position; a slide valve closing said outlet openings when in said first operative position and opening said outlet openings when in a second operative position for discharging air from said passenger compartment to atmosphere through said air passage; an arm connected to said slide valve and extending tangent to said tubular member; gear means on said rotatable member and said arm coactive together to move said slide valve between its first and second operative positions when said tubular member is rotated between its first and second operative positions; said inner roof panel opening to said passenger compartment at a low level with respect to said inlet opening and in the rear of said passenger compartment to define an exhaust flow path therefrom between said roof panels to said outlet openings.

3. A ventilation system for a vehicle of the type having a passenger compartment partially defined by a windshield and a roof comprising: an outer roof panel with inlet and outlet openings therethrough located rearwardly of said windshield; an inner roof panel spaced from said outer roof panel to form an air passage therebetween; a housing member supported on said outer roof panel in overlying relation to said inlet and outlet openings; said housing member including a forwardly extending air scoop to direct air through said inlet opening; inlet valve means extending through said inlet opening and said inner roof panel for controlling air flowing into said passenger compartment; said valve means including a rotatable tubular member having an axial passage therethrough and a partially closed semi-circular end portion; said housing member having a cylindrical portion with a bore therethrough adapted to extend through said inlet opening for air passage and for supporting said tubular valve member for rotation; a partially closed semi-circular end portion on said cylindrical portion coactive with said semi-circular end portion of said valve means to block air flow through said axial passage when the tubular member is pivoted into a first operative position and opening said axial passage for air flow into said passenger compartment when pivoted into a second operative position; a slide valve closing said outlet openings when in said first operative position and opening said outlet openings when in a second operative position for discharging air from said passenger compartment to atmosphere through said air passage; an arm connected to said slide valve and extending tangent to said tubular member; gear means on said rotatable member and said arm coactive together to move said slide valve between its first and second operative positions when said tubular member is rotated between its first and second operative positions; said inner roof panel opening to said passenger compartment at a low level with respect to said inlet opening and in the rear of said passenger compartment to define an exhaust flow path therefrom between said roof panels to said outlet openings.

* * * * *